United States Patent Office 3,047,561
Patented July 31, 1962

3,047,561
PREPARATION OF STABLE CELLULOSE TRIESTERS
Carlton L. Crane, Rochester, N.Y., assignor to Eastman Kodak Company, Rochester, N.Y., a corporation of New Jersey
No Drawing. Filed Sept. 2, 1959, Ser. No. 837,574
12 Claims. (Cl. 260—227)

This invention relates to the manufacture of stable cellulose triesters which involves subjecting the cellulose triester in solution in the esterification bath in which it had been prepared to treatment with a substantial excess of neutralizing agent and then subjecting to a temperature of at least 200° F.

In the past, it has been difficult and expensive to manufacture cellulose esters having a hydroxyl content of less than 0.4%, an intrinsic viscosity of at least 1 and a substantial absence of combined sulfur. The stabilizing of cellulose esters in solution in their anhydrous esterification bath involving neutralization of catalyst and subjecting to a raised temperature has been proposed. The amount of neutralizing agent has been restricted to no more than will completely neutralize the catalyst. Although the esters thus obtained have had a satisfactory solution viscosity they have a low intrinsic viscosity such as to preclude their use for products of good dimensional stability.

In the preparation of lower fatty acid esters of cellulose in which sulfuric acid catalyst is employed the sulfuric acid combines with the cellulose whereby sulfate groups are introduced. The usual practice for removing the combined sulfate from the cellulose esters has been to add water to the esterification bath in the form of dilute acid, such as dilute acetic acid in sufficient quantity to convert the residual fatty acid anhydride in the esterification bath to acid plus sufficient excess of water to remove the combined sulfate from the ester. In practice, this excess of water not only converts the residual fatty acid anhydride and removes the combined sulfate, but invariably causes a slight hydrolysis of the cellulose ester, which increases the hydroxyl content of the ester.

One object of my invention is to prepare lower fatty acid esters of cellulose having hydroxyl contents of not more than 0.2%. Another object of my invention is to provide a process for preparing cellulose triesters which are heat stable. A further object of my invention is to provide a method of stabilizing cellulose triesters without the addition of water to the esterification bath and the destruction of fatty acid anhydride thereby. Other objects of my invention will appear herein.

I have found that substantially hydroxyl-free cellulose esters of good stability result when there is added to the completed esterification mass a di- or tri-valent metal compound neutralizing agent 1½–5 times that which will neutralize the sulfuric acid in the mass and subjecting to a temperature of at least 200° F. for a short time, such as 2 hours or more. Thereby cellulose esters are obtained having no more than 0.2% of hydroxyl therein, an amount of combined sulfur of less than 0.005% (preferably less than 0.002%) and an intrinsic viscosity above 1 and preferably above 1.5 in methylene chloride-methyl alcohol (9:1). The neutralizing agent added in an amount 1½–5 or more times that equivalent to the amount of sulfuric acid catalyst used in the esterification is preferably an alkaline earth metal salt of a weak acid. Nevertheless, salts of other di- or tri-valent metals may be used, particularly if those salts are soluble in the esterification bath and will react with the sulfuric acid to form insoluble salts. Carbonates, hydroxides, oxides or acetates of calcium, magnesium, barium, iron and aluminum can be used. The neutralization of the sulfuric acid catalyst with considerably more neutralizer than required results in products of practically no hydroxyl content plus good color and heat stability. If desired, the completed esterification mass after the stabilization treatment has been performed can be mixed with an inert medium which is non-solvent for the cellulose ester, such as Stoddard solvent or hexane to precipitate the cellulose ester. Unreacted anhydride and uncombined acid may be thus reclaimed. Fatty acid anhydride may be recovered without the necessity of azeotropic distillation.

My invention provides for the use of the neutralizing agent in an amount at least 1½ times that necessary to neutralize the sulfuric acid, such as up to 5 parts or even more. It may include that modification whereby the sulfuric acid catalyst is all neutralized by means of calcium, magnesium or some other polyvalent metal ion neutralizing agent and the remainder of the alkalinity may be provided by means of the salt of an alkali metal such as sodium acetate or sodium carbonate.

After the esterification mass has been subjected to neutralization the mass is maintained at a temperature of 200° F. or more for at least 2 hours up to 20 hours or even more. It is preferred, however, especially in the case of the higher temperatures that the time be no more than 10 hours. The intrinsic viscosity of the cellulose ester should be such that it is above one and preferably greater than 1.5 when taken in a 9:1 methylene chloride-methyl alcohol determination. My invention is directed to preparing triesters of the lower fatty acid esters of cellulose, the fatty acid groups of which are of 2–4 carbon atoms, such as cellulose acetate, cellulose acetate propionate, cellulose acetate butyrate, cellulose propionate and cellulose butyrate. The following examples illustrate procedures useful in preparing low hydroxyl, heat stable cellulose esters of high intrinsic viscosity in accordance with my invention.

*Example 1*

3 parts of cotton linters, after soaking in distilled water, were dehydrated with three successive changes of propionic acid. These linters were then placed in a jacketed sigma bladed esterification mixer with sufficient additional propionic acid to provide 14.2 parts of liquid. 8.1 parts of cooled 97% acetic anhydride were added and the mass was cooled to 50° F. 0.135 part of sulfuric acid (95.6%) dissolved in 0.2 part of propionic acid was added to the mixer and the reaction was run allowing the temperature to rise to 90–91° F. over a period of 3½ hours. Upon completion of the esterification 0.286 part of 85% magnesium carbonate were added and stirring was continued for 15 minutes. The mass was then transferred to a jacketed autoclave and was heated and stirred at 300° F. with samples being removed at intervals. These samples were diluted with acetic acid, precipitated in distilled water, washed with distilled water until free from uncombined acids and dried without further stabilization. The dry products analyzed as follows:

| Time in Autoclave (Hours) | Intrinsic Viscosity in methylene chloride-methyl alcohol, 9:1 | Percent Hydroxyl |
| --- | --- | --- |
| 4 | 1.60 | 0.18 |
| 8 | 1.50 | 0.12 |
| 12 | 1.35 | 0.10 |
| 16 | 1.25 | 0.11 |
| 20 | 1.16 | 0.05 |

*Example 2*

7 parts of activated cotton linters (4 parts dry cellulose) prepared by soaking in distilled water and dehydrating with propionic acid, were placed in a jacketed sigma bladed esterification mixer (Werner-Pfleiderer type) together with 24 parts of 97% propionic anhydride. After cooling the mass to 40° F. a solution of 0.073 part of sulfuric acid (95.6%) in 0.1 part of propionic acid was added. The reaction was run allowing the temperature to rise to 82° F. over a period of 7 hours. Upon completion of the esterification 0.141 part of 85% magnesium carbonate was added and the mixture was stirred for 30 minutes. The mass was then transferred to a jacketed autoclave and was heated and stirred at 250° F. Samples were taken as described in the previous example. The products obtained analyzed as follows:

| Time in Autoclave (Hours) | Intrinsic Viscosity in methylene chloride-methyl alcohol, 9:1 | Percent Hydroxyl |
|---|---|---|
| 4 | 2.03 | 0.11 |
| 8 | 2.00 | 0.11 |
| 12 | 2.00 | 0.10 |
| 16 | 1.94 | 0.08 |

Heating of each of the samples at 180° C. for 8 hours indicated they all had good stability. Cellulose esters prepared by the herein described esterification methods, but with no stabilization, char at 180° C.

*Example 3*

9 parts of cotton linters were placed in a jacketed sigma bladed esterification mixer with 49.5 parts of acetic acid and 30 parts of 97% acetic anhydride. After stirring for ½ hour at 112° F. the mass was cooled to 41° F. A mixture of 0.65 part of 95% sulfuric acid and 1.5 parts of acetic acid was added and the reaction was run allowing the temperature to rise to 116° F. over a period of 1¾ hours. Upon completion of the esterification 0.66 part of 85% magnesium carbonate were added and the temperature was raised to 185° F. 0.605 part of 85% magnesium carbonate were then added and the temperature was raised to and maintained at 246° F., with samples being removed at intervals. These were diluted with acetic acid, precipitated in distilled water, washed free from acids and salts and dried. The products analyzed as follows:

| Time after neutralization of catalyst, hrs | Total Sulfur, Percent | Total Hydroxyl, Percent | Intrinsic Viscosity in $CH_2Cl_2$/$CH_3OH$, 9:1 |
|---|---|---|---|
| 3 | 0.002 | 0.1 | 2.03 |
| 6 | .001 | .08 | 1.99 |
| 9 | .002 | .07 | 1.88 |

These esters when dissolved in methylene chloride-methyl alcohol 93:7 and cast on glass plates gave clear, flexible, tough films.

*Example 4*

8 parts of cotton linters were soaked in distilled water and dehydrated with three successive changes of butyric acid. The resulting linters consisting of 8 parts of cellulose and 6.7 parts of butyric acid were mixed with 40 parts of 97% butyric anhydride in a jacketed sigma bladed esterification mixer, and the mass was cooled to 40° F. 0.145 part of 95% sulfuric acid in 0.2 part of butyric acid were added to the mixer and the reaction temperature was allowed to rise to 80° F. over a period of 8¾ hours. Upon completion of the esterification 0.64 part of 85% magnesium carbonate were added and the temperature was raised to and maintained at 250° F. Samples, removed at intervals were diluted with acetic acid, precipitated in distilled water, washed until free from acids and dried without further stabilization. The products analyzed as follows:

| Time in mixer after neutralization with $MgCO_3$, hrs. | Intrinsic Viscosity in $CH_2Cl_2$/$CH_3OH$, 9:1 | Total Hydroxyl, Percent | M. P.,[1] ° C. |
|---|---|---|---|
| 3 | 1.37 | 0.12 | 196 |
| 6 | 1.33 | 0.08 | 196 |
| 9 | 1.33 | 0.08 | 196 |

[1] M. P.=Melting Point.

*Example 5*

9 parts of cotton linters were soaked in distilled water and dehydrated with 3 successive changes of propionic acid. The activated linters consisting of 9 parts of the linters and 7.7 parts of propionic acid were placed in a jacketed sigma bladed esterification mixer and 34.9 parts of propionic acid and 24.3 parts of 97% acetic anhydride was added. The resulting slurry was cooled to 39° F. 0.4 part of 95% sulfuric acid in 0.6 part of propionic acid were added and the reaction was run allowing the temperature to rise to 90° F. over a period of 3½ hours. Upon completion of the esterification 0.84 part of 94% calcium carbonate were added to the mixer. The temperature of the mass was raised to 250° F. and maintained for 4 hours. The mass was diluted with 4 parts of acetic acid for each part of solution and was precipitated into distilled water. The product was washed in successive changes of distilled water until substantially free from acids and salts and was dried. The dry product which was a cellulose acetate propionate analyzed as follows:

Total hydroxyl _____ percent__ 0.09
Total sulfur _____ do____ 0.0011
Ash _____ do____ 0.014
Acetyl _____ do____ 26.8
Propionyl _____ do____ 20.5
Intrinsic Viscosity in $MeCl_2$—$CH_3OH$ (9:1) __ 1.27

*Example 6*

12 parts of cotton linters were mixed in a jacketed sigma bladed esterification mixer with 18.9 parts of acetic acid for 1 hour at 120° F. 48 parts of 97% propionic anhydride were then added to the mixer and the slurry was cooled to 40° F. 0.22 part of 95% sulfuric acid in 0.1 part of acetic acid were added and the reaction was run allowing the temperature to rise to 88° F. over a period of 6½ hours. Upon completion of the esterification 0.43 part of 85% magnesium carbonate were added and the temperature was raised to 250° F. and maintained there for a period of 3½ hours. A portion of the mass was diluted with acetic acid and precipitated by pouring into 3 parts (per part of mass) of rapidly agitated Stoddard solvent. The reaction liquids and Stoddard solvent were drained from the glossy fine precipitate, a fresh portion of Stoddard solvent was added and the mass was stirred and drained. The ester was washed with successive changes of distilled water until free from acids and salts and was dried. The cellulose acetate propionate thus obtained analyzed as follows:

Total hydroxyl _____ percent__ 0.14
Acetyl _____ do____ 19.1
Propionyl _____ do____ 29.8
(n) in $CH_2Cl_2$—$CH_3OH$ (9:1) _____ 2.02
M.P. _____ ° C____ 255

The remainder of the reaction solution was diluted with acetic acid and precipitated into 40% aqueous acetic acid. The product was washed in distilled water until substantially free from acids, boiled in distilled water containing 0.0022 parts of oxalic acid per part of dry cellulose ester, drained, then boiled 2 hours in distilled water, drained and dried. Analysis of the product was as follows:

| | | |
|---|---|---|
| Total hydroxyl | percent | 0.04 |
| Acetyl | do | 19.1 |
| Propionyl | do | 29.3 |
| (n) in $CH_2Cl_2$—$CH_3OH$ (9:1) | | 2.07 |
| M.P. | °C | 250 |
| Char point | °C | 290 |

Example 7

400 parts of cotton linters was soaked in distilled water and dehydrated with 3 successive changes of butyric acid. The activated linters resulting, consisting of 400 parts of cellulose and 320 parts of butyric acid, were placed in a jacketed sigma bladed esterification mixer to which 1120 parts of 97% acetic anhydride, 680 parts of acetic acid and 980 parts of butyric acid were added. The mass was cooled to 42° F. and a mixture of 29.3 parts of 94% sulfuric acid and 100 parts of butyric acid was added thereto. The esterification was run allowing the reaction temperature to rise to 89° F. over a period of 3 hours. After the completion of the esterification 56 parts of 85% magnesium carbonate was stirred into the mixer and the temperature of the mass was raised to 250° F. and maintained for 4 hours. The solution was diluted with acetic acid and precipitated in distilled water. A fine precipitate was obtained which was washed with successive changes of distilled water until the product was substantially free from acids and salts. The product was dried at 160° F. The dry product analyzed as follows:

| | | |
|---|---|---|
| Total hydroxyl | percent | 0.05 |
| Acetyl | do | 33.8 |
| Butyryl | do | 12.9 |
| Total sulfur | do | 0.002 |
| (n) in $CH_2Cl_2$—$CH_3OH$ (9:1) | | 2.1 |
| M.P. | °C | 270 |
| Char point | °C | 305 |

The completed esterification baths which are treated in accordance with my invention have sufficient acid anhydride therein that anhydrous conditions prevail throughout the treatment. Ordinarily, as cellulose esterification processes are carried out the amount of anhydride remaining is sufficient to assure anhydrous conditions in the stabilization operation. The temperature employed should be at least 200° F. and not more than 350° F. Although adequate stabilization is obtained in times within the range of 2–10 hours, longer times such as up to 40 hours are not outside the scope of the invention.

I claim:

1. A method of preparing cellulose triesters of excellent stability, which comprises substantially completely esterifying cellulose with an esterification bath of fatty acid anhydride, diluent and sulfuric acid catalyst and subjecting the thus formed cellular ester in solution in the completed esterification bath to a temperature of 200–350° F. under anhydrous conditions after the sulfuric acid catalyst used has been completely neutralized with a chemically equivalent amount of base material selected from the group consisting of the carbonates, hydroxides, oxides, and acetates of calcium, magnesium, barium, iron, and aluminum plus further addition of base material so that the total base material added to the bath is chemically equivalent to 1½ to 5 times the amount of sulfuric acid catalyst used.

2. A method of preparing cellulose triesters of excellent stability, which comprises substantially completely esterifying cellulose with an esterification bath of fatty acid anhydride, diluent and sulfuric acid catalyst and subjecting the thus formed cellulose ester in solution in the completed esterification bath to a temperature of 200–350° F. under anhydrous conditions after the sulfuric acid catalyst used has been completely neutralized with base material selected from the group consisting of the carbonates, hydroxides, oxides, and acetates of calcium, magnesium, barium, iron, and aluminum in an amount chemically equivalent to 1½ to 5 times the sulfuric acid catalyst used.

3. A method of preparing cellulose triesters of excellent stability, which comprises substantially completely esterifying cellulose with an esterification bath of fatty acid anhydride, diluent, and sulfuric acid catalyst and subjecting the thus formed cellulose ester in solution in the completed esterification bath to a temperature of 200–350° F. under anhydrous conditions after the sulfuric acid catalyst used has been completely neutralized with magnesium base in an amount chemically equivalent to 1½ to 5 times the sulfuric acid catalyst used.

4. A method of preparing cellulose triesters of excellent stability, which comprises substantially completely esterifying cellulose with an esterification bath of fatty acid anhydride, diluent and sulfuric acid catalyst and subjecting the thus formed cellulose ester in solution in the completed esterification bath to a temperature of 200–350° F. under anhydrous conditions after the sulfuric acid catalyst used has been completely neutralized with calcium base in an amount chemically equivalent to 1½ to 5 times the sulfuric acid catalyst used.

5. A method of preparing cellulose triesters of excellent stability, which comprises substantially completely esterifying cellulose with an esterification bath of acetic anhydride, diluent and sulfuric acid catalyst and subjecting the thus formed cellulose ester in solution in the completed esterification bath to a temperature of 200–350° F. under anhydrous conditions after the sulfuric acid catalyst used has been completely neutralized with a base material selected from the group consisting of the carbonates, hydroxides, oxides, and acetates of calcium, magnesium, barium, iron, and aluminum, the total amount of base added to the bath being chemically equivalent to 1½ to 5 times to the amount of sulfuric acid catalyst used.

6. A method of preparing cellulose triacetates of excellent stability, which comprises substantially completely esterifying cellulose with an esterification bath of acetic anhydride, acetic acid and sulfuric acid catalyst and subjecting the thus formed cellulose ester in solution in the completed esterification bath to a temperature of 200–350° F. under anhydrous conditions, after the sulfuric acid catalyst used has been completely neutralized with chemically equivalent amount of base material selected from the group consisting of the carbonates, hydroxides, oxides, and acetates of calcium, magnesium, barium, iron, and aluminum plus further base material so that the total base material added to the bath is chemically equivalent to 1½ to 5 times the amount of sulfuric acid catalyst used.

7. A method of preparing cellulose acetate propionate triester of excellent stability, which comprises substantially completely esterifying cellulose with an esterification bath containing acetyl and propionyl groups made up of fatty acid anhydride, diluent, and sulfuric acid catalyst and subjecting the thus formed cellulose acetate propionate in solution in the completed esterification bath to a temperature of 200–350° F. under anhydrous conditions after the sulfuric acid catalyst used has been completely neutralized with a chemically equivalent amount of base material selected from the group consisting of carbonates, hydroxides, oxides, and acetates of calcium, magnesium, barium, iron, and aluminum plus further base so that the total amount of base material added to the base is chemically equivalent to 1½ to 5 times the amount of sulfuric acid catalyst used.

8. A method of preparing cellulose tripropionate of excellent stability, which comprises substantially completely esterifying cellulose with an esterification bath of propionic anhydride, diluent, and sulfuric acid catalyst and subjecting the thus formed cellulose tripropionate in solution in the completed esterification bath to a temperature of 200–350° F. under anhydrous conditions after the sulfuric acid catalyst used has been completely neutralized with a chemically equivalent amount of base material selected from the group consisting of the carbonates, hydroxides, oxides, acetates of calcium, magnesium, barium, iron, and aluminum plus further addition of base material so that the total base material added to the bath is chemically equivalent to 1½ to 5 times the amount of the sulfuric acid catalyst used.

9. A method of preparing cellulose acetate butyrate triester of excellent stability, which comprises substantially completely esterifying cellulose with an esterification bath containing acetyl and butyryl groups composed of fatty acid anhydride, diluent and sulfuric acid catalyst and subjecting the thus formed cellulose ester in solution in the completed esterification bath to a temperature of 200–350° F. under anhydrous conditions after the sulfuric acid catalyst used has been completely neutralized with a chemically equivalent amount of base material selected from the group consisting of the carbonates, hydroxides, oxides, and acetates of calcium, magnesium, barium, iron, and aluminum plus further addition of base material so that the total base material added to the bath is chemically equivalent to 1½ to 5 times the amount of the sulfuric acid catalyst used.

10. A method of preparing cellulose tributyrate of excellent stability, which comprises substantially completely esterifying cellulose with an esterification bath of butyric anhydride, diluent, and sulfuric acid catalyst and subjecting the thus formed cellulose ester in solution in the completed esterification bath to a temperature of 200–350° F. under anhydrous conditions after the sulfuric acid catalyst used has been completely neutralized with a chemically equivalent amount of base material selected from the group consisting of the carbonates, hydroxides, oxides, and acetates of calcium, magnesium, barium, iron, and aluminum plus further addition of base material so that the total base material added to the bath is chemically equivalent to 1½ to 5 times the amount of the sulfuric acid catalyst used.

11. A method of preparing cellulose triesters of excellent stability, which comprises substantially completely esterifying cellulose with an esterification bath of fatty acid anhydride, diluent and sulfuric acid catalyst and subjecting the cellulose ester in solution in the bath to a temperature of 200–350° F. under anhydrous conditions after the sulfuric acid catalyst used has been completely neutralized with magnesium carbonate in an amount 1½ to 5 times that chemically equivalent to the sulfuric acid catalyst.

12. A method of preparing cellulose acetate propionate triester which comprises substantially completely esterifying cellulose with bath composed of propionic anhydride, acetic acid and sulfuric acid catalyst and subjecting the cellulose ester in solution in the completed esterification bath to a temperature of approximately 250° F. under anhydrous conditions after the sulfuric acid catalyst used has been neutralized with magnesium carbonate in an amount 1½ to 5 times that chemically equivalent to the sulfuric acid catalyst.

References Cited in the file of this patent

UNITED STATES PATENTS

| | | |
|---|---|---|
| 2,072,260 | Haney | Mar. 2, 1937 |
| 2,126,190 | Hofman | Aug. 9, 1938 |
| 2,203,700 | Seymour et al. | June 11, 1940 |
| 2,456,688 | Dreyfuss et al. | Dec. 21, 1948 |
| 2,582,049 | Malm et al. | Jan. 8, 1952 |
| 2,673,202 | Crane | Mar. 23, 1954 |